US006446149B1

(12) United States Patent
Moriarty et al.

(10) Patent No.: US 6,446,149 B1
(45) Date of Patent: Sep. 3, 2002

(54) SELF-MODIFYING SYNCHRONIZATION MEMORY ADDRESS SPACE AND PROTOCOL FOR COMMUNICATION BETWEEN MULTIPLE BUSMASTERS OF A COMPUTER SYSTEM

(75) Inventors: Michael P. Moriarty, Spring; Thomas J. Bonola, Tomball; Craig A. Walrath, Spring; Charles N. Shaver, Cypress, all of TX (US)

(73) Assignee: Compaq Information Technologies Group, L.P., Houston, TX (US)

( * ) Notice: Subject to any disclaimer, the term of this patent is extended or adjusted under 35 U.S.C. 154(b) by 0 days.

(21) Appl. No.: 09/033,964

(22) Filed: Mar. 3, 1998

(51) Int. Cl.$^7$ .............................................. G06F 15/16
(52) U.S. Cl. ...................... 710/110; 710/108; 709/213; 709/216; 711/152; 711/163
(58) Field of Search ................................ 709/213, 214, 709/216; 711/152, 163; 710/107, 108, 110

(56) References Cited

U.S. PATENT DOCUMENTS

| | | | | |
|---|---|---|---|---|
| 4,380,798 A | * | 4/1983 | Shannon et al. ............ | 364/200 |
| 4,574,350 A | * | 3/1986 | Starr | |
| 4,594,657 A | * | 6/1986 | Byrns ......................... | 364/200 |
| 4,835,674 A | * | 5/1989 | Collins et al. ............... | 364/200 |
| 4,901,230 A | * | 2/1990 | Chen et al. .................. | 364/200 |
| 5,175,820 A | | 12/1992 | Stumf et al. ................. | 395/375 |
| 5,339,443 A | * | 8/1994 | Lockwood ................... | 395/725 |
| 5,377,331 A | * | 12/1994 | Drerup et al. | |
| 5,379,379 A | * | 1/1995 | Becker et al. | |
| 5,432,929 A | * | 7/1995 | Escola et al. ................ | 395/600 |

(List continued on next page.)

OTHER PUBLICATIONS

Shanley, Tom "Pentium ® Pro Processor System Architecture," Chapter 10, Obtaining Bus Ownership, Addison–Wesley Developers Press, © 1997 by Mindshare, Inc., pp. 201–237.

(List continued on next page.)

Primary Examiner—Mark H. Rinehart
Assistant Examiner—Stephan Willett
(74) Attorney, Agent, or Firm—Akin, Gump, Strauss, Hauer & Feld, LLP

(57) ABSTRACT

A computer system provides a self-modifying synchronization memory address space and protocol for communication between multiple busmasters. In one computer system embodiment, the self-modifying synchronization memory address space is provided in a memory controller embedded in a peripheral device of the computer system such as a bridge that provides central, high speed access by a busmaster to the memory controller without accessing a host bus. The synchronization memory address space includes a set of semaphore memory cells mapped to shared critical resources in the computer system. The semaphore memory cell allows for exclusive access by a busmaster to a shared critical resource by switching itself from an idle state to a busy state responsive to a first read operation by a busmaster. In the busy state of the semaphore memory cell, a busy state is communicated to other busmasters which attempt to read the semaphore memory cell. Ownership of the semaphore memory cell is thus achieved using a single operation by a busmaster. The properties of the self-modifying synchronization memory address space and the semaphore memory cell thus eliminate the need for assertion of a bus locking signal to achieve exclusive access for a busmaster to a shared critical resource. These properties also eliminate the need for host processor intervention in accessing a shared critical resource when a busmaster is a PCI master.

48 Claims, 7 Drawing Sheets

U.S. PATENT DOCUMENTS

| | | | |
|---|---|---|---|
| 5,530,941 A | * | 6/1996 | Weisser et al. |
| 5,548,780 A | | 8/1996 | Krein .......................... 395/825 |
| 5,619,726 A | * | 4/1997 | Seconi et al. |
| 5,623,670 A | * | 4/1997 | Hohannon et al. .......... 395/726 |
| 5,664,092 A | * | 9/1997 | Waites ................... 395/183.01 |
| 5,699,540 A | * | 12/1997 | Vanka et al. |
| 5,727,172 A | | 3/1998 | Eifert et al. ................ 395/290 |
| 5,761,731 A | * | 6/1998 | Van Doren et al. ......... 711/155 |
| 5,799,207 A | * | 8/1998 | Wang et al. |
| 5,838,913 A | * | 11/1998 | Lysejko et al. |
| 5,848,252 A | * | 12/1998 | Granau et al. |
| 5,850,571 A | * | 12/1998 | Odom et al. |
| 5,872,941 A | * | 2/1999 | Goodrum et al. |
| 5,894,562 A | * | 4/1999 | Moyer |
| 5,922,057 A | * | 7/1999 | Holt ............................ 710/52 |
| 5,958,035 A | * | 9/1999 | Carter et al. |
| 5,961,625 A | * | 10/1999 | Carter |
| 5,966,543 A | * | 10/1999 | Hartnet et al. .............. 395/726 |
| 6,026,461 A | * | 2/2000 | Baxter et al. |

OTHER PUBLICATIONS

Shanley, Tom and Anderson, Don, Johns, "PCI System Architecture, Third Edition," Chapter 12, Shared Resource Acquisition, Addison–Wesley Publishing Company, © 1995 by Mindshare, Inc., pp. 231–247.

Shanley, Tom and Anderson, Don, "PCI System Architecture, Third Edition," Chapter 19, PCI–to–PCI Bridge, Addison–Wesley Publishing Company, © 1995 by Mindshare, Inc., pp. 381–455.

Shanley, Tom and Anderson, Don, "PCI System Architecture, Third Edition," Chapter 21, PCI Cache Support, © 1995 by Mindshare, Inc., pp. 471–491.

* cited by examiner

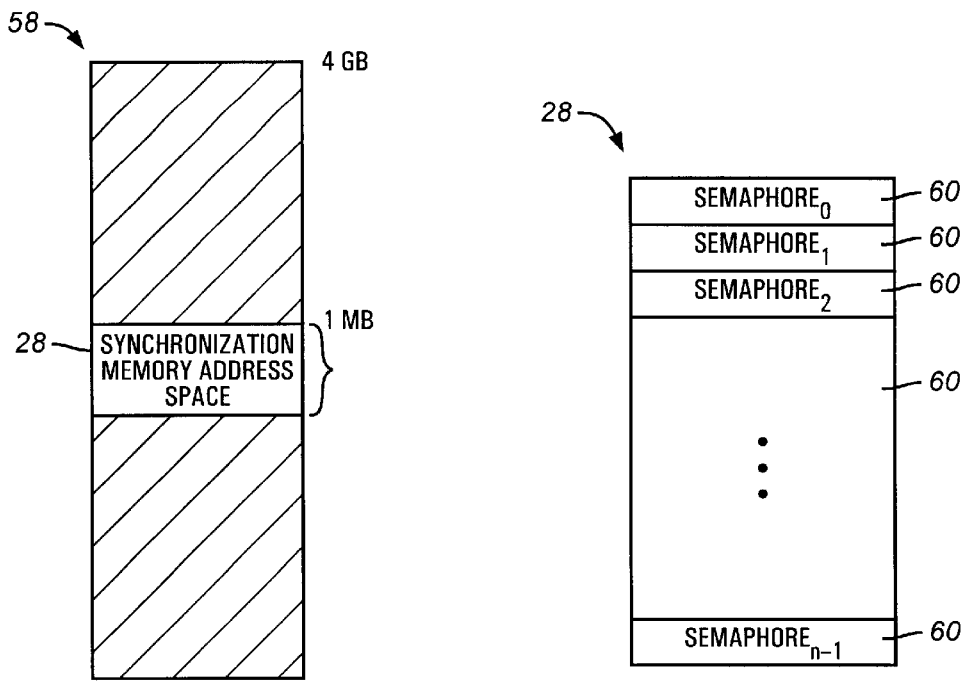
FIG. 2
FIG. 3
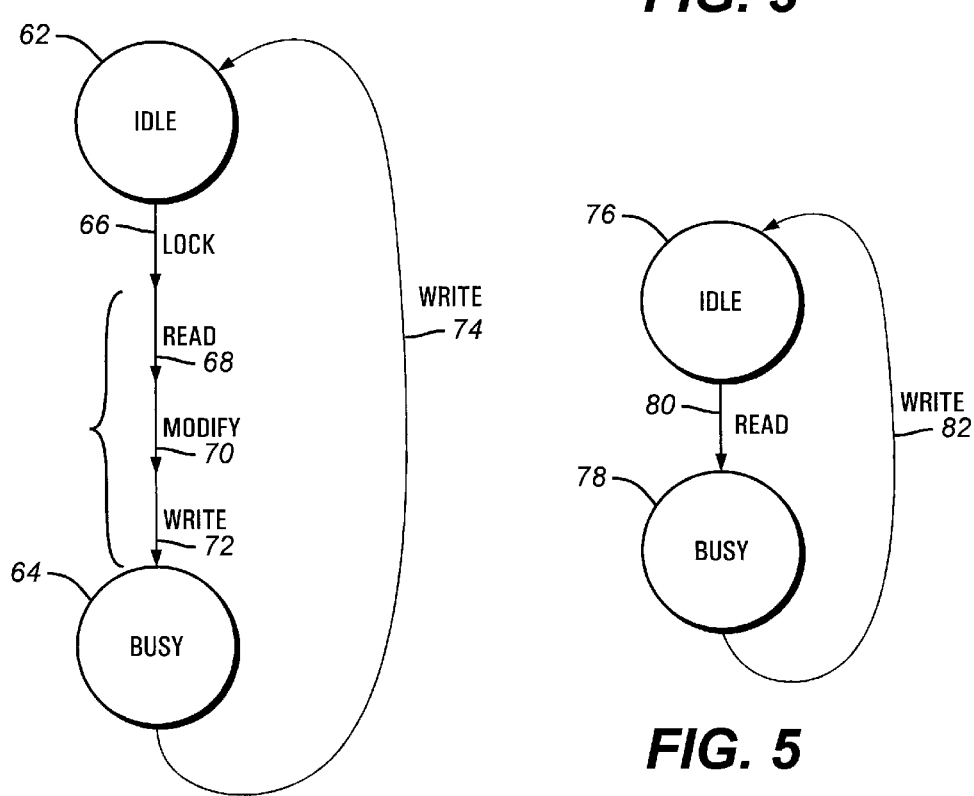
(PRIOR ART)
FIG. 4
FIG. 5

| LOGICAL STATES | RD | WR | b∅ | b∅' | |
|---|---|---|---|---|---|
| 0 | 0 | 0 | 0 | — | N/A |
| 1 | 0 | 0 | 1 | — | N/A |
| 2 | 0 | 1 | 0 | 1 | CLAIMED |
| 3 | 0 | 1 | 1 | 1 | BUSY |
| 4 | 1 | 0 | 0 | 0 | N/A |
| 5 | 1 | 0 | 1 | 0 | RELEASED |
| 6 | 1 | 1 | 0 | 0 | N/A |
| 7 | 1 | 1 | 1 | 1 | N/A |

86 ↘

| [31:20] | [19:5] | [4:3] |
|---|---|---|
| 1M CHANNEL 2 PHYSICAL BASE ADDRESS | SEMAPHORE ADDRESS | PCI BUS MASTER ID |

| BITS[7:5] | BIT 4 | BIT 3 | BIT 2 | BIT 1 | BIT 0 |
|---|---|---|---|---|---|
| RESERVED | REFLECTED WRITE | DISABLE WRITE THRU A GATEWAY | WRITE PASSED THRU A GATEWAY | BUSMASTER CACHE ENABLE | 1 |

| [31:20] | [19] | [18] | [15:8] | [7:0] |
|---|---|---|---|---|
| SYNCHRONIZATION MEMORY PHYSICAL BASE ADDRESS | SYNCHRONIZATION MEMORY CHANNEL ENABLE | REFLECTOR ENABLE | PHYSICAL BASE ADDRESS OF SYNCHRONIZATION MEMORY CHANNEL LOCAL TO BRIDGE | TOP OF SYNCHRONIZATION MEMORY CHANNEL LOCAL TO BRIDGE |

FIG. 12

SELF-MODIFYING SYNCHRONIZATION MEMORY ADDRESS SPACE AND PROTOCOL FOR COMMUNICATION BETWEEN MULTIPLE BUSMASTERS OF A COMPUTER SYSTEM

BACKGROUND OF THE INVENTION

1. Field of the Invention

The present invention relates to synchronization between multiple busmasters in a computer system, and more particularly to a self-modifying synchronization memory address space and protocol for communication between multiple busmasters.

2. Description of the Related Art

For computer systems including heterogeneous busmasters and loosely coupled busses, such as distributed computer systems and certain multiprocessor computer systems, shared memory synchronization between multiple busmasters is a primary concern. While homogenous busmasters are generally able to communicate directly with one another, synchronization between heterogenous busmasters and between certain homogenous busmasters, which are unable to communicate directly with one another, has typically required host processor intervention. Host processors have allowed for exclusive accesses by heterogenous busmasters to shared memory by issuing atomic transactions. An atomic transaction is a transaction including operations which are performed without interference from other processes. Atomic transactions have typically included assertion of a bus locking signal. An atomic transaction for achieving an exclusive access for a busmaster has included at least two operations, a read operation and a write or set operation. A semaphore memory variable is a flag object for coordinating exclusive access to a critical region of a shared memory. During a read operation, a semaphore memory variable is read, and during a write or set operation, a value is written to the semaphore memory variable. Implementing atomic transactions has required special processor instructions for performing a sequence of real and write operations. Examples of special processor instructions include 'swap' instructions, memory exchange instructions, 'test & set' instructions, and 'read-modify-write' instructions. The most prevalent special processor instruction has been the 'read-modify-write' instruction. Each special processor instruction, like the 'read-modify-write' instruction, essentially performs a read-modify-write cycle. Also, in implementing atomic transactions, it has been necessary to launch an atomic transaction on a bus having a bus protocol supporting the particular special processor instruction.

An algorithm including a special processor instruction for performing a read-modify-write cycle, such as the ACQUIRE_SPINLOCK routine provided in Windows NT®, is used to synchronize access to a shared memory between multiple busmasters. The routine is initiated by a busmaster seeking to determine if a semaphore memory variable may be claimed. The special processor instruction commonly used in the ACQUIRE_SPINLOCK routine to perform a read-modify-write cycle is the Exchange instruction. The Exchange operation is an intrusive operation which includes an assertion of a bus locking signal by a processor.

A bus locking signal such as Intel's LOCK# signal on the X86 processors is typically used in connection with an atomic transaction to permit a busmaster to attempt to claim a semaphore memory variable. When a bus locking signal is asserted, the associated bus is locked, preventing other busmasters from acquiring ownership of the bus and, thus, access to the semaphore memory variable. The locked cycle of the busmaster terminates when the bus locking signal is deasserted. A bus locking signal undesirably consumes or narrows bandwidth of the associated bus. A bus locking signal also has the drawback of being specific for a particular bus locking architecture. For example, a PCI master is presently unable to initiate a LOCK# signal onto a host bus. A further disadvantage is that assertion of a bus locking signal forces posted writes within a host processor to be flushed to main memory.

SUMMARY OF THE INVENTION

Briefly, the system and method according to the present invention provides a synchronization memory address space and synchronization memory protocol for communication between multiple busmasters in a computer system. The self-modifying synchronization memory address space is preferably located in a memory controller embedded in a peripheral device such as a bridge that provides central, high speed access by a busmaster to the memory controller without accessing a host bus. The address space includes a set of semaphore memory cells mapped to shared critical resources in the computer system. Each region of the self-modifying synchronization address space corresponding to a particular shared critical resource serves as a synchronization memory channel.

The semaphore memory cell allows for exclusive access by a busmaster to a shared critical resource by switching itself from an idle state to a busy state responsive to a first read operation by a busmaster. In the busy state of the semaphore memory cell, a busy state is communicated to other busmasters which attempt to read the semaphore memory cell. Ownership of the semaphore memory cell is thus achieved using a single operation by a busmaster.

Further, the semaphore memory cell responsive to a write operation by a busmaster owning the semaphore memory cell switches itself from a busy state back to an idle state. A semaphore memory cell having an idle state is available to be claimed by a busmaster. The write to the semaphore memory cell by a busmaster may be broadcast to other busmasters. Sideband signals are defined to detect when the bridges associated with the target busmasters are ready to receive the broadcast write. If the target busmaster to receive the broadcast write is associated with a different host bridge than the busmaster initiating the write to the semaphore memory cell, the host bridge associated with the initiating busmaster may reflect the write to the host bridge associated with the target busmaster. A broadcast write may also serve to invalidate a cache line of the target busmaster corresponding to the semaphore memory cell to which a value has been written.

Each bridge in the computer system preferably includes a synchronization bridge configuration register. A synchronization bridge configuration register allows a bridge to determine whether a target address provided by a busmaster is mapped to the self-modifying synchronization memory address space, whether the synchronization memory channel local to the bridge is enabled, and whether a bridge is reflector enabled so as to allow the bridge to reflect a write to another bridge. The synchronization bridge also may indicate the location of the synchronization memory channel local to the bridge.

BRIEF DESCRIPTION OF THE DRAWINGS

A better understanding of the present invention can be obtained when the following detailed description of the preferred embodiment is considered in conjunction with the following drawings, in which:

FIG. 2 is a memory map of a physical memory address space including the synchronization memory address space of FIG. 1;

FIG. 3 is an illustration of the synchronization memory address space of FIG. 1;

FIG. 4 is a state diagram of a prior art synchronization memory protocol;

FIG. 5 is a state diagram of the synchronization memory protocol of the present invention;

FIG. 9 is an illustration of a bit definition for a synchronization address of the present invention;

FIG. 10 is an illustration of a bit definition for synchronization data of the present invention;

FIG. 12 is an illustration of a bit definition for a synchronization bridge configuration register of the present invention;

DETAILED DESCRIPTION OF THE PREFERRED EMBODIMENT

Figure 1:
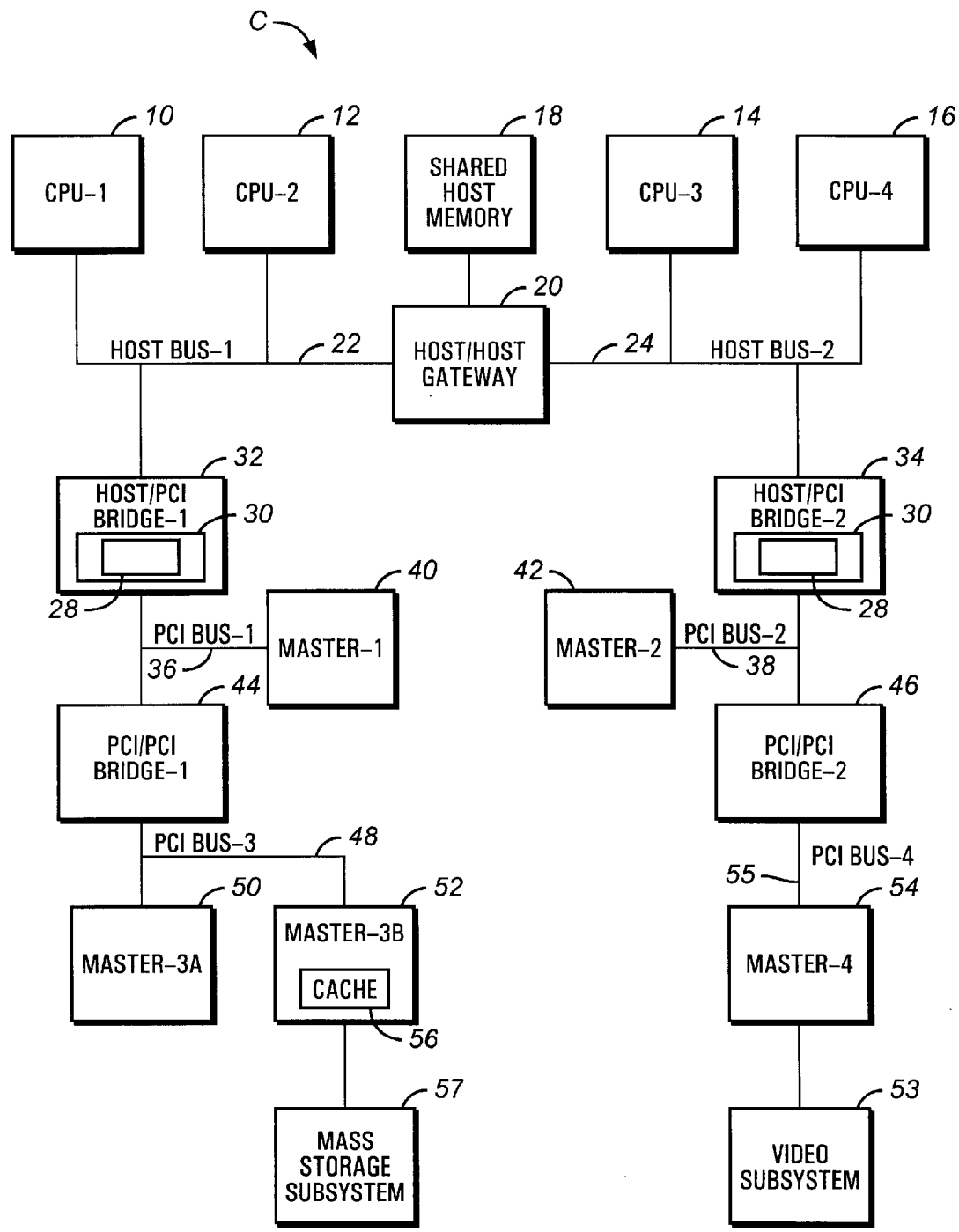
FIG. 1 is a schematic diagram of a computer system including a synchronization memory address space and synchronization memory channel of the present invention.

Turning now to the drawings, FIG. 1 is a schematic diagram of a multiprocessor computer system C. The multiprocessor computer system C may include four microprocessors CPU-1 10, CPU-2 12, CPU-3 14, and CPU-4 16. CPU-1 10 and CPU-2 12 are coupled to a host or processor bus 22, and CPU-3 14 and CPU-4 16 are coupled to a separate host or processor bus 24. It should be understood that the computer system C may be single processor system or a multiprocessor system. The two host busses 22 and 24 are coupled to one another through a host/host gateway 20. The host/host gateway 20 is coupled to a shared host memory 18 and a memory controller 30. The shared host memory 18, which is shared between the microprocessors 10, 12, 14, and 16, includes critical memory regions with each region providing exclusive access by a single busmaster.

Each of the host busses 22 and 24 is further coupled to a peer host/PCI bridge 32 and 34. A host/PCI bridge serves as a connection between a host bus and a PCI bus. Details on the PCI bus may be found in the *PCI Local Bus Specification, Production Version*, Revision 2.1, dated Jun. 1, 1995, published by the PCI Special Interest Group of Hillsboro, Oregon, which is hereby incorporated by reference in its entirety. The host/PCI bridge-1 32 connects host bus-1 22 and PCI bus-1 36, and the host PCI bridge-2 34 connects host bus-2 24 and PCI bus-2 38. The PCI bus 36 and 38 coupled to each host/PCI bridge 32 and 34 is also coupled to a busmaster 40 and 42 and a PCI/PCI bridge 44 and 46. A PCI/PCI bridge serves as a connection between one PCI bus and another PCI bus. PCI/PCI bridge-1 44 connects PCI bus-1 36 and PCI bus-3 48. PCI bus-3 48 connects to a busmaster 50 and a busmaster 52, the latter having a cache 56. PC/PCI bridge-2 46 connects PCI bus-2 38 and a PCI bus-4 55. PCI/PCI bridge-2 46 is further coupled to a busmaster 54. The number of host busses, host/PCI bridges, PCI/PCI bridges, busmasters, and host/host gateways may of course vary within the computer system C. For example, the computer system may include a single host bus and therefore not include a host/host gateway. Further, it should be understood that a busmaster may or may not include a cache. Examples of busmasters in a computer system include, but are not limited to, SCSI controllers, network interface controllers (NIC), video graphic controllers, disk controllers, direct memory access controllers, and microprocessors. For example, the busmaster 52 is illustrated as controlling a mass storage subsystem 57, and the busmaster 54 is illustrated as controlling a video subsystem 53.

The memory controllers 30A and 30B include synchronization memory address space regions 28A and 28B. These regions collectively form the self-modifying synchronization memory address space 28 of the present invention. Each region of the synchronization memory address space 28 is preferably located in a memory controller embedded in a peripheral device such as a bridge that provides central, high speed access by a busmaster to the memory controller without accessing the host bus.

Critical regions of the shared host memory 18 and critical devices within the computer system S are mapped into the self-modifying synchronization memory address space 28, which serves as a surrogate target of a request by a busmaster. A region of the address space 28 corresponding to a particular shared resource may be termed a synchronization memory channel. The synchronization memory address space 28 includes a set of semaphore memory cells 60. Each critical region within the shared host memory 18 and each critical device is preferably associated with one of the semaphore memory cells 60. The particular state or mode of a particular semaphore memory cell 60 is communicated to a busmaster requesting the semaphore memory cell 60. It should be understood that the self-modifying synchronization memory address space 28 may be configured as a single synchronization memory channel or a plurality of synchronization memory channels.

For conventional synchronization memory protocols, it has been necessary for a busmaster such as a CPU to assert a LOCK# signal or an atomic transaction to attempt to claim a semaphore associated with a shared critical resource. A LOCK# signal is in a deasserted state when the LOCK# signal is not being used. When a LOCK# signal is asserted during access to a semaphore, another busmaster can not acquire ownership of the semaphore. If a busmaster asserts a LOCK# signal, a bus arbiter locks the associated bus. A LOCK# signal thereby prevents another busmaster from claiming a semaphore from the time the busmaster initiates a read of the semaphore to the time the busmaster writes a value, typically a non-zero value, to the semaphore indicating the semaphore is available. Assertion of the LOCK# signal over a host and PCI bus has been somewhat inefficient. A LOCK# signal undesirably consumes or narrows bandwidth of a PCI bus and host bus. Further under the current PCI specification, a PCI master is unable to initiate a LOCK# signal into host memory; therefore, host processor intervention has been necessary to initiate a LOCK# signal in such circumstances.

The self-modifying synchronization memory address space 28, however, achieves a multi-master synchronization memory protocol without consuming bandwidth of a host bus. By locating the synchronization address space 28 between a host bus and a plurality of busmasters, a busmaster may access the self-modifying synchronization address space 28 without an access of the host bus. The semaphore memory cell 60 of the synchronization address space 28 has the ability to switch itself from an idle state to a busy state in response to a first read operation by a busmaster. In this way, exclusive access to a shared critical resource such as the shared host memory 18 is achieved without assertion of a LOCK# signal. A further advantage when the requesting busmaster is a PCI master is that access to a shared central resource is obtained without host processor intervention. The multi-master synchronization memory protocol is understood by the device drivers associated with busmasters of the computer system S.

Referring to FIG. 2, the self-modifying synchronization memory address space 28 is shown in a physical memory address space 58 of the computer system C. The physical memory address space 58 of a computer system is typically four gigabytes (GB). Within that four gigabyte memory address space, the synchronization memory address space 28 is programmed. The self-modifying synchronization memory address space 28 for example may be a one megabyte (MB) memory "hole" of the physical memory address space 58. In accordance with convention, the bottom of the self-modifying synchronization memory address space 28 may be termed the physical base address of the self-modifying synchronization memory address space 28. Critical regions of the shared host memory 18 and other shared critical resources in the computer system C may be mapped into the self-modifying synchronization memory address space 28.

Referring to FIG. 3, an illustration of the self-modifying semaphore memory address space 28 is shown. Each semaphore memory cell 60 of the semaphore memory address space 28 is preferably a separate cache line or is the size of a cache line in order to exploit concurrency. Since each semaphore 60 guards a mutually exclusive memory region or resource, a busmaster claiming one semaphore 60 should not be able to affect or block a busmaster claiming a different semaphore. If more than one semaphore 60 is provided on a single cache line, a busmaster claiming one semaphore 60 affects a busmaster claiming the other semaphore 60 on the same cache line. In conventional synchronization memory protocols, semaphores have shared cache lines and also have straddled cache lines. A semaphore straddles a cache line where one portion of a semaphore is on one cache line and another portion is on a different cache line. The synchronization memory protocol of the present invention preferably avoids both straddling of a cache line and interleaving of semaphores within a single cache line.

Referring to FIG. 4, a state diagram of a prior art synchronization memory protocol is shown. When a busmaster seeks to claim a semaphore in an idle state 62, the busmaster first asserts a LOCK# signal as indicated in step 66. Next, the busmaster performs an atomic transaction including a series of atomic operations to claim the semaphore. It should be understood that the LOCK# signal may be asserted as part of the atomic transaction or before the atomic transaction. In step 68, the read operation to the semaphore 60 is atomically performed. In this operation, the idle state 62 of the semaphore is communicated to the busmaster. Next, in step 70, the busmaster performs a modify operation internal to the busmaster. Control then passes to step 72 wherein the busmaster performs a write operation to the semaphore to place the semaphore in a busy state. The read-modify-write cycle performed by steps 68–72 includes at least two operations to be performed by a busmaster such as a microprocessor, namely, a read operation and a write operation. If a semaphore is split across address boundaries, cache line boundaries, or page boundaries, more than two transactions have historically been necessary to accomplish a read-modify-write cycle. If a semaphore is in a busy state 64, 7a write operation by the busmaster to the semaphore as indicated in step 74 returns the semaphore to an idle state 62. ACQUIRE_SPINLOCK is a routine provided in Windows NT® to synchronize access to a shared critical resource such as a shared region in host memory between multiple busmasters. The algorithm is initiated by a busmaster seeking to determine if a semaphore may be claimed. An example of an ACQUIRE_SPINLOCK algorithm in assembly language pursuant to the conventional synchronization memory protocol illustrated in FIG. 4 follows:

| ACQUIRE_SPINLOCK: | | |
|---|---|---|
| | MOV | EAX, 1 |
| Spin: | CMP | Semaphore, 0 |
| | JNE | SHORT Spin |
| | XCHG | Semaphore, EAX |
| | CMP | EAX, 0 |
| | JNE | SHORT Spin |

In the first line of the code, the number '1' is stored in an EAX register by a move (MOV) instruction. The EAX register is a 16 bit general purpose register of a microprocessor when that processor is a x86 compatible processor. Next, the semaphore is compared to a '0' through a compare (CMP) instruction. For this particular memory protocol, a '1' represents a busy state of a semaphore and a '0' represents an idle state of a semaphore. Next, a jump not equal (JNE) instruction is executed. If the semaphore is not equal to '0,' then the jump not equal operation jumps back to the compare instruction termed Spin, and the compare instruction is again executed to compare the semaphore to a '0'. Following execution of the compare instruction, the jump not equal instruction is again executed. As long as the semaphore is not equal to '0', the code continues to loop back to the compare instruction. If the semaphore is not equal to '0', the semaphore is equal to a '1' indicating to a busmaster that the semaphore is in a busy state. If the jump not equal instruction detects that the semaphore is equal to '0', indicating the semaphore requested by a busmaster is in an idle state, the code proceeds to the next instruction.

The code next executes the Exchange instruction (XCHG) performing an exchange operation in which the contents of the semaphore and the contents of the EAX register are exchanged or swapped. If the Exchange operation was successful, then the EAX register contains a '0'. The Exchange instruction includes an assertion of a LOCK# signal by a processor and is therefore an intrusive operation. It should be understood that certain instructions, if prefixed with a lock prefix, may force an assertion of a LOCK# signal. As noted earlier, a LOCK# signal requires host processor intervention and also consumes or narrows bandwidth of a host bus and PCI bus. The exchange operation of the ACQUIRE_SPINLOCK algorithm corresponds to the atomic read-modify-write cycle and LOCK# signal assertion of FIG. 4. An atomic read-modify-write cycle using a LOCK# signal causes bus thrashing and flushing of write-posting buffers of a host processor. If a semaphore is cacheable, an atomic read-modify-write operation may also be performed by locking the semaphore cache line. Locking a semaphore cache line has also required assertion of a LOCK# signal.

Following execution of the Exchange instruction, a compare instruction for comparing the EAX register to a '0' is executed. Since the contents of the semaphore was placed in the EAX register by the Exchange instruction, the EAX register will contain a '0' if the semaphore contained a '0'. Next, a jump not equal instruction is executed such that the code jump backs to the compare instruction designated Spin if the EAX register does not contain a '0'. If the EAX register does not contain a '0', the EAX register contains a '1' indicating the semaphore is in a busy state. If the semaphore is in a busy state, another busmaster has claimed the semaphore ahead of the LOCK# signal asserted by the busmaster seeking to claim the semaphore. If the requesting busmaster is cacheable, the compare or Spin operation is directed to the semaphore in the cache of the requesting busmaster. If the EAX register contains a '0', the semaphore is in an idle state and may be claimed by the busmaster initiating the ACQUIRE_SPINLOCK algorithm.

Referring to FIG. 5, a state diagram of the synchronization memory protocol in a system according to the present invention is shown. If a busmaster issues a read operation in step 80 to a semaphore 60 in an idle state 76, the semaphore memory cell 60 switches itself to a busy state 78. Any subsequent reads by another busmaster will thus read busy. Unlike conventional synchronization memory protocols, a busmaster only performs a single operation, being the read operation of step 80 to attempt to claim a semaphore 60. In addition, it is unnecessary for a busmaster to comprehend a LOCK# signal since the semaphore memory cell 60 switches itself to a busy state. A busmaster therefore instead need only comprehend a basic read operation to detect if a semaphore memory cell 60 is in a busy state or an idle state. The read operation illustrated in step 80 corresponds to a first read by a busmaster.

An improved ACQUIRE_SPINLOCK algorithm in assembly language and based on the synchronization memory protocol illustrated in FIG. 5 follows:

```
ACQUIRE_SPINLOCK
Spin:     CMP     Semaphore, 0
          JNE     SHORT Spin
```

The improved ACQUIRE_SPINLOCK algorithm includes only two assembly language instructions. The first instruction is a compare instruction for comparing the semaphore 60 to a '0'. Control then proceeds to execution of a jump not equal instruction. The jump not equal instruction detects whether the semaphore 60 is not equal to '0'. If the semaphore 60 is not equal to '0', the code loops back to the compare instruction which is again executed. As long as the semaphore 60 is not equal to '0', the compare instruction and jump not equal instruction are repeatedly executed. If the jump not equal instruction detects that the semaphore 60 is equal to '0', indicating the semaphore 60 is in an idle state, the code terminates. The improved ACQUIRE_SPINLOCK algorithm does not require assertion of a LOCK# signal via an exchange instruction because the semaphore 60 switches itself to a busy state.

Further while a conventional ACQUIRE_SPINLOCK algorithm requires six lines of assembly language code, the improved ACQUIRE_SPINLOCK algorithm of the present invention uses only two lines of assembly language code. The improved ACQUIRE_SPINLOCK algorithm, therefore, is approximately a 70% reduction in code size from conventional ACQUIRE_SPINLOCK algorithms, resulting in an improved execution cycle reduction for a microprocessor executing the code. The improved ACQUIRE_SPINLOCK algorithm may also be directly represented in the C programming language as follows:

define ACQUIRE_SPINLOCK
While (volatile unsigned char Semaphore);

The specific assembly language code and C code provided above are exemplary representations of the improved ACQUIRE_SPINLOCK algorithm. Thus, it should be understood that different code representations of the improved ACQUIRE_SPINLOCK algorithm are possible.

Figures 6, 7:
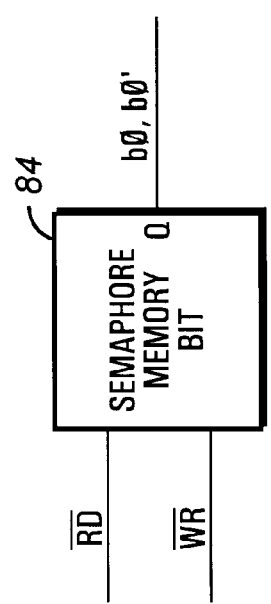
FIG. 6 is an illustration of a semaphore memory bit of the semaphore memory cell of FIG. 3.
FIG. 7 is a table of the logical states for the semaphore memory bit of FIG. 6.

Referring to FIG. 6, an illustration of a semaphore memory bit 84 of the present invention is shown. A semaphore memory cell 60 is preferably implemented as a semaphore memory bit 84. The semaphore memory bit 84 of FIG. 6 includes two active low inputs, a read signal RD_ and a write signal WR_. The output line of the semaphore memory bit 84 is designated with a Q. The initial state b∅ (FIGS. 6 and 7) for the semaphore memory bit 84 and the subsequent or current state b∅' of the semaphore memory bit 84 correspond to the output line Q.

Turning to FIG. 7, a table of the various logical states for the semaphore memory bit 84 is shown. The three variables affecting the current state of the semaphore memory bit 84 are the read signal variable RD, the write signal variable WR, and the initial state b∅. In accordance with convention, the read signal logical variable RD is the inverse of the electrical read signal RD_, and the write signal logical variable WR is the inverse of the electrical write signal WR_. The RD variable, write variable WR, and initial state b∅ are each either set to a '0' or a '1'; therefore, eight states may be defined for the semaphore memory bit 84.

States 0–1 and 6–7 are inapplicable for the semaphore memory bit 84. States 0–1 are inapplicable since neither a read operation nor a write operation is performed in either state. States 6–7 are inapplicable since a read operation and a write operation may not be performed simultaneously. In state 2, the read signal RD_ is asserted indicating that a read operation is being performed. Also in this state, the write signal WR_ is deasserted indicating that a write operation is not being performed, and the initial state b∅ of the semaphore bit 84 is '0' indicating that the semaphore memory bit 84 is initially unclaimed or in an idle state. As indicated by the table, the read operation results in the semaphore memory bit 84 switching itself from an initial state of '0' to a current state of '1'. The '1' state indicates that the semaphore memory bit 84 is claimed by the busmaster performing the read operation.

In state 5, unlike in state 2, the read signal RD_ is deasserted indicating that a read operation is not being performed. Also in state 5, the write signal WR_ is asserted indicating that a write operation is being performed, and b∅ has a '1' state indicating that the semaphore memory bit 84 is initially in a busy state. As indicated in the table, this particular combination of state variables causes the semaphore memory bit 84 to switch from a '1' state to a '0' state indicating that the semaphore memory bit 84 is being released by a busmaster. Thus, state 2 represents the read operation of step 80 illustrated in FIG. 5, and state 5 represents the write operation of step 82 illustrated in FIG. 5.

In state 3, the read signal RD__ is asserted, the write signal WR__ is deasserted, and the initial state b∅ of the semaphore memory bit 84 is '1'. State 3 represents a read operation other than a first read operation by busmaster. This logical state may be termed a busy state of the semaphore memory bit 84. While logical state 3 of the semaphore memory bit 84 represents the busy state of a semaphore memory cell 60, it should be understood that logical states 2 and 5 of the semaphore memory bit 84 represent state transitions for the semaphore memory cell 60. Logical state 3 of the semaphore memory bit 84 typically follows logical state 2. For example, if a busmaster performs two read operations to the semaphore memory bit 84, logical state 2 corresponds to the first read operation and logical state 3 corresponds to the second read operation. Logical state 3 also applies to any subsequent read operations following the second read operation. Logical state 4 is inapplicable for the semaphore memory bit 84 since any write to the semaphore memory bit 84 by a busmaster results in a state transition in accordance with the synchronization memory protocol of the present invention.

Figure 8A:
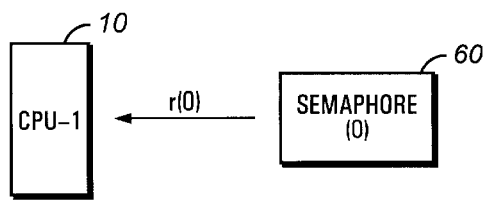
FIGS. 8A–8E are schematic illustrations of the synchronization memory protocol of the present invention.
Figure 8B:
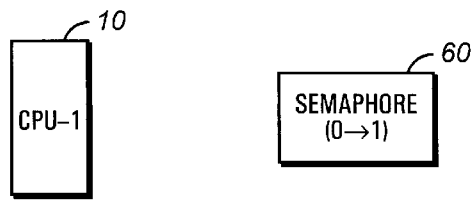

Referring to FIGS. 8A–8E, a synchronization memory protocol according to the present invention is illustrated. In FIG. 8A, CPU-1 10 performs a read operation to the semaphore memory cell 60 or semaphore memory bit 84. The '0' or idle state of the semaphore memory 60 is thereby communicated to CPU-1 10. Next, in FIG. 8B, the semaphore memory cell 60 switches itself from a '0' or idle state to a '1' or busy state. In a conventional synchronization memory protocol, it has been necessary not only for the CPU to write a '1', or busy state, to a semaphore, but also to lock the associated bus during that process. A conventional synchronization protocol therefore has required an atomic transaction including at least two atomic operations, a read operation and a write operation, on the part of a busmaster. In contrast, according to the present invention, providing a semaphore memory cell 60 capable of switching itself from an idle state to a busy state reduces the number of operations performed needed by a busmaster. The synchronization protocol of the present invention in effect allows for an exclusive read mode by a busmaster. Therefore, use of the semaphore memory cell 60 eliminates the need to assert a LOCK# signal for semaphore operations.

Figure 8C:
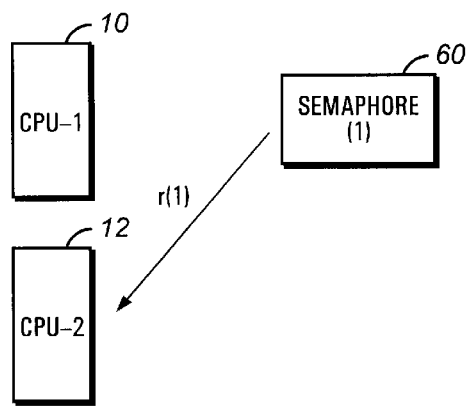
Figure 8D:
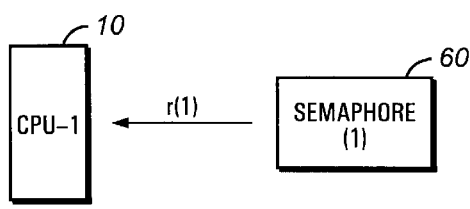
Figure 8E:
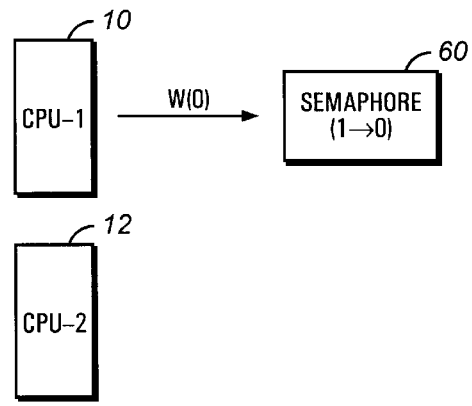

Turning to FIG. 8C, a read operation by a second microprocessor CPU-2 12 is illustrated. Since the semaphore memory cell 60 is now in a busy state, a '1' state is communicated to CPU-2 12. FIG. 8D represents a subsequent read by CPU-1 to the semaphore memory cell 60. Since CPU-1 10 owns the semaphore memory cell 60, a '1' state is communicated to CPU-1 10. FIG. 8D thus illustrates any subsequent read operation by a busmaster already owning a semaphore memory cell 60. Referring to FIG. 8E, a write operation by CPU-1 10 to the semaphore memory cell 60 is illustrated. Numerous read operations may be performed by a busmaster between a first read operation and a write operation. The semaphore memory cell 60 responsive to the write operation by CPU-1 10 switches itself from a '1' state representing a busy state to a '0' state representing an idle state. Any subsequent read by a busmaster to the semaphore memory cell 60 would therefore indicate an idle or '0' state.

Referring to FIG. 9, an illustration of a definition for a synchronization address 86 provided by a requesting busmaster to address a semaphore 60 in the self-modifying synchronization memory address space 28 is shown. Bits 20–31 of the synchronization address 86 represent the physical base address for the self-modifying synchronization memory address space 28. Bits 5–19 represents the particular address of a semaphore 60 requested by a busmaster. Bits 3–4 represent an encoded identification value for a PCI master. This set of bits is only applicable for a request by a PCI master. The PCI master identification value is used to inform a bridge of which PCI master is requesting a semaphore. Bits 0–2 (not shown) are undefined for the synchronization address 86. This exemplary definition of a synchronization address 86 provides for 32 bits. It should be understood that the number of bits for definition of the synchronization address 86 may vary.

Referring to FIG. 10, the definition of the lowest addressed semaphore byte 88 of a semaphore memory cell 60 is illustrated. Bytes of the semaphore memory cell 60 other than the lowest addressed semaphore byte 88 are used to hold read or write data. The lowest addressed semaphore byte 88 is the control portion of the semaphore memory cell 60 used to inform a bridge or gateway of particular characteristics of a semaphore request. It should be understood that the number of bits of the semaphore memory cell 60 used as the control portion may vary. Bits 5–7 are preferably reserved and therefore return only zeros. Bit 4 which has a default value of '0' is set to a '1' by a reflector enabled host bridge on a reflected write. A reflected write is a write by a cacheable busmaster in which the write is reflected or rewritten from one host bridge to a different host bridge associated with the target busmaster or device. If should be understood that a host bridge is any bridge connecting a host bus to another input/output bus. The host bridge reflecting the write to another host bridge is termed a "reflector." A host bridge which is reflector enabled serves as the reflector. A reflector disabled host bridge may not serve as a reflector. In addition to reflecting a write to a different host bus, a reflector enabled bridge serves to terminate the reflected write cycle in accordance with a standard bus protocol.

In accordance with the synchronization memory protocol of the present invention, a reflected write is used to invalidate a surrogate copy of a semaphore memory cell 60 in a cache of a busmaster. The reflector enabled bridge is coupled to the host bus associated with the cacheable busmaster. Host bridges should be selectively reflector enabled depending on whether the host bridge is coupled to a host bus associated with a cacheable busmaster. Only one host bridge coupled to such a host bus need be reflector enabled to provide a host bridge able to reflect a write to any target device downstream of the host bus.

Figure 13:
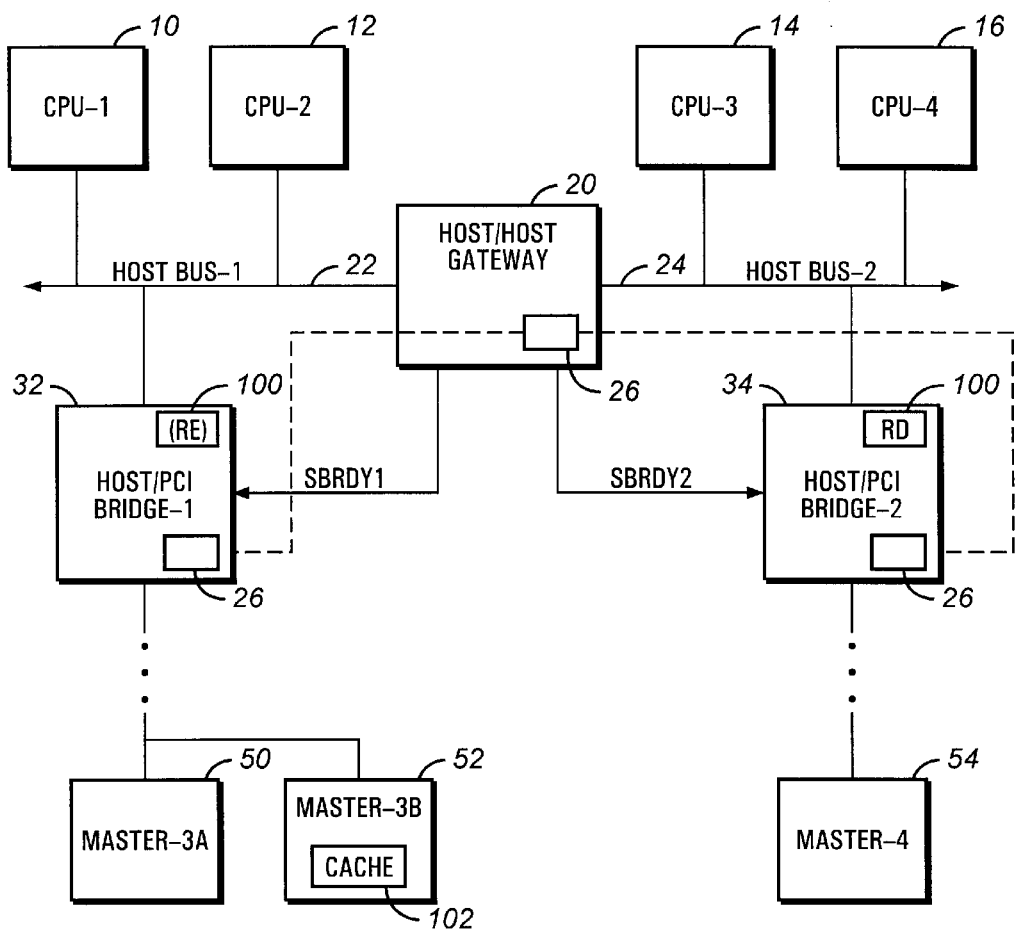
FIG. 13 is a simplified schematic diagram of the computer system of FIG. 1 depicting a reflector enabled host bridge and sideband signals of the present invention.

Turning to FIG. 13, a simplified schematic diagram of the computer system C is shown. In this embodiment, the host bridge 32 is reflector enabled (RE), and the host bridge 34 is reflector disabled (RD). The bridge 32 is reflector enabled since a busmaster 52 having a cache 102 is local to the host bus 22 coupled to the bridge 32. The bridge 32 when reflector enabled is able to invalidate a surrogate copy of a semaphore memory cell 60 in the cache 102 of the busmaster 52 corresponding to the semaphore address reflected. The reflected write is preferably used to invalidate the surrogate copy of the memory cell 60 with a snoop operation.

Returning to FIG. 10, bit 3 of the lowest addressed semaphore byte 88 which has a default value of '0' is set to a '1' if a semaphore write should not be reflected or broadcast across a host gateway 20. This bit should only be set by a reflector enabled bridge on each host bus to reflect a write to invalidate and clear a semaphore of a busmaster local to a host bus. Bit 2 which has a default value of '0' should be set to a '1' only by a gateway to notify bridges that a semaphore write was not initiated on a host bus local to the gateway. This bit if set to '1' thereby notifies a local reflector enabled bridge not to reflect a current write cycle.

Bit 1 is a busmaster cache enable bit. This bit should only be set by busmasters with a cache enabled for a write-through mode or a write-back invalidate mode if available. Bit 1 notifies a local reflector enabled bridge to re-broadcast the current write cycle to invalidate the cache of a cacheable busmaster. Bit '0' should be set to a '1' when a write operation to a semaphore 60 is performed. This prevents a busmaster from reclaiming a semaphore without accessing a synchronization memory channel 26.

Figure 11:
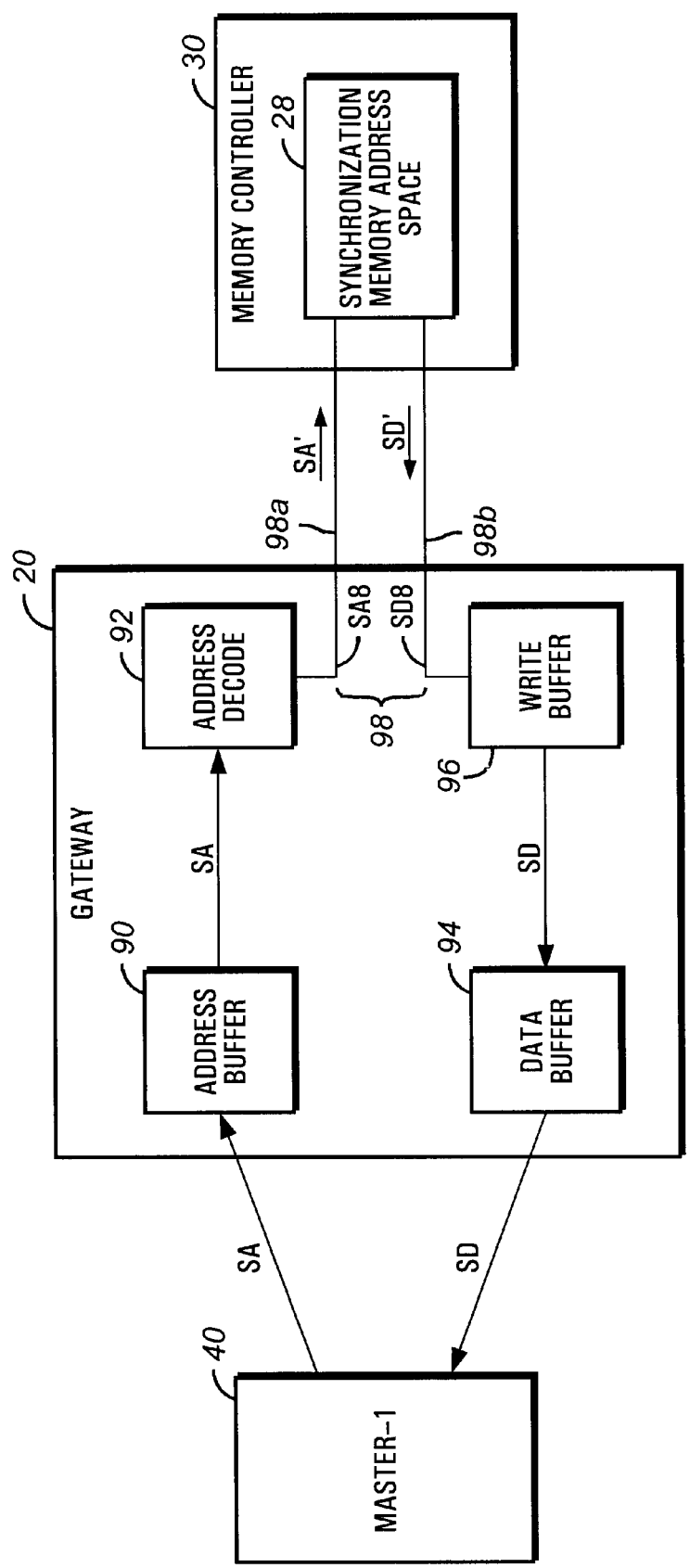
FIG. 11 is a schematic diagram of a busmaster, gateway, and synchronization memory address space of FIG. 1 and the synchronization memory bus of the present invention.

Referring to FIG. 11, the flow of a semaphore address SA and semaphore data SD between the busmaster 40, the gateway 20, and the synchronization memory address space 28 is shown. The semaphore data SD is preferably a cache line having a lowest addressed semaphore byte 88 defined in accordance with the bit definition of FIG. 10. The busmaster 40 provides a semaphore address SA as part of a synchronization address to an address buffer 90 in the gateway 20 to request a semaphore 60. The semaphore address SA is then provided from the address buffer 90 to address decode logic 92. The address decode logic 92 decodes the semaphore address SA. The address decode logic 92 identifies an address as a semaphore address SA if the provided address is between the physical base address for the synchronization memory address space 28 and the top of the synchronization memory address space 28. The decoded semaphore address SA' is then provided to the synchronization memory address space 28. As noted earlier, the synchronization memory address space 28 may be provided in a memory controller 30 as illustrated. In response to the decoded semaphore address SA', the synchronization memory address space 28 provides semaphore data SD from the particular memory location of the synchronization memory address space 28 corresponding to its decoded semaphore address SA. The decoded semaphore address SA' provided between the address decode logic 92 and the synchronization memory address space 28 travels across a synchronization address bus 98A. The semaphore data provided from the synchronization memory address space 28 to a write buffer 96 travels across a synchronization data bus 98B. The synchronization address bus 98A and the synchronization data bus 98B together form a synchronization memory bus 98 according to the present invention. From the write buffer 96, semaphore data SD is provided to a data buffer 94. The data buffer 94 provides the semaphore data SD to the busmaster 40. It should be understood that busses and bridges may be provided between the gateway 20 and the busmaster 40.

Referring to FIG. 12, a synchronization bridge configuration register 100 according to the present invention for a bridge is illustrated. Each bridge in the computer system S may include a synchronization bridge configuration register 100 which is preferably initialized during system configuration at startup time of the computer system S. System configuration is performed by configuration software executed by a host processor. The synchronization bridge configuration register 100 may be mapped to I/O space or memory space of the computer system S. Bits 20–31 represent the physical base address of the synchronization memory address space 28. If the synchronization memory address space 28 is configured as a one megabyte address space, for example, then the top of the synchronization memory address space 28 is one megabyte above the physical base address of the synchronization memory address space 28. Bits 20–31 allow a bridge to determine whether an address of a target device provided by a busmaster is mapped to the synchronization memory address space 28. Bit 19 represents the local synchronization memory channel enable. If bit 19 is set to a '0', then the local synchronization memory channel 26 is disabled for the particular bridge. If bit 19 is set to '1', then the local synchronization memory channel 26 is enabled for the particular bridge. Bit 18 is the reflector enable bit. If bit 18 is set to '1', then the particular bridge is reflector-enabled. If bit 18 is set to '0', then the particular bridge is reflector-disabled. Bits 8–15 represent the physical base address of a synchronization memory channel 26 local to the particular bridge. If a synchronization memory address space 28 is configured as a number of synchronization memory channels, then bits 8–15 permit a bridge to determine the physical base address of the particular synchronization memory channel 26 local to the bridge. Bits 0–7 represent the top of the synchronization memory channel local 26 to the particular bridge.

Figure 14:
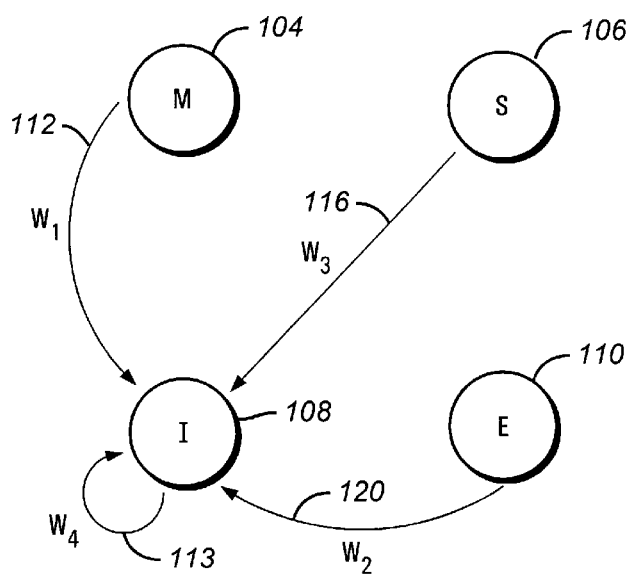
FIG. 14 is a state diagram of the cache line states for a cache of a busmaster of FIG. 13 in accordance with the synchronization memory protocol of the present invention.

Referring to FIG. 14, a state diagram for the states of a cache of a cacheable busmaster in accordance with the synchronization memory protocol of the present invention is shown. In accordance with MESI protocol, the standard protocol for cache line states, the four possible states for cache line are represented. The M state 104 refers to a modified cache line; the S state 106 refers to a shared cache line; the E state 110 refers to an exclusive cache line; and the I state 108 refers to an invalid cache line. In accordance with the synchronization memory protocol of the present invention, certain cache line state transitions controlled by a cache controller are used to preserve cache consistency. If a write operation is performed by a busmaster to one of the semaphore memory cells 60, the semaphore cache line corresponding to the semaphore memory cells 60 of a cacheable busmaster receiving the write is marked invalid, thereby placing the cache line in an invalid state. $W_1$ represents a write operation 112 triggering a state transition from a semaphore cache line 160 in a modified state 104 to an invalid state 108. $W_2$ represents a write operation 120 triggering a state transition from a semaphore cache line 60 in an exclusive state 110 to an invalid state 108. $W_3$ represents a write operation 116 triggering a state transition from a semaphore cache line 60 in a shared state 106 to an invalid state 108. $W_4$ represents a write operation 113 maintaining an invalid state for a semaphore cache line 60.

Lastly, the synchronization memory protocol according to the present invention is particular useful for a computer system C including heterogenous busmasters and loosely coupled busses. In a computer system C including heterogenous busmasters and loosely coupled busses, busmasters are unable to communicate with each other without host processor intervention. A system according to the present invention eliminates the need for host processor intervention for certain transactions by providing a self-modifying synchronization memory address space allowing heterogeneous busmasters to directly communicate with one another. As a result, the amount of external interrupt activity generated back to host processors in a computer system is reduced in accordance with the present invention. For example, one heterogeneous busmaster may synchronize itself with another heterogenous busmaster by requesting a semaphore in the self-modifying synchronization memory address space associated with the other busmaster.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

We claim:

1. A computer system adapted for a self-modifying synchronization memory protocol for multiple busmasters, comprising:

at least one host processor;

at least one host bus coupled to the host processor;

a plurality of busmasters;

a self-modifying synchronization memory address space coupled to the host bus and including at least one semaphore memory cell having an idle state or a busy state, the self-modifying synchronization memory address space being coupled between the host bus and the plurality of busmasters, the self-modifying synchronization memory address space being accessible by the plurality of busmasters independent of the host bus; and the semaphore memory cell switching itself to a busy state only if the semaphore memory cell is read by a busmaster of the plurality of busmasters when the semaphore memory cell is in an idle state so that the semaphore memory cell is owned by the busmaster, wherein the semaphore memory cell retains the busy state until a subsequent action by the busmaster that owns the semaphore memory cell triggers the semaphore memory cell to switch itself to the idle state, and wherein a busmaster desiring ownership of the semaphore memory cell repeatedly reads the semaphore memory cell until is owned by the busmaster desiring ownership of the semaphore memory cell.

2. The computer system of claim 1, wherein the semaphore memory cell switches itself to an idle state if a write is issued to the semaphore memory cell by a busmaster owning the semaphore memory cell so that the busmaster releases ownership of the semaphore memory cell.

3. The computer system of claim 1, further comprising:

at least one shared resource mapped into the self-modifying synchronization memory address space.

4. The computer system of claim 1, the computer system including a memory controller, wherein the self-modifying synchronization address space is located in the memory controller.

5. The computer system of claim 4, the computer system including a bridge, wherein the memory controller is located in the bridge.

6. The computer system of claim 1, wherein the self-modifying synchronization address space is a non-cacheable address space.

7. The computer system of claim 1, wherein the self-modifying synchronization address space is a write-through cacheable address space.

8. The computer system of claim 1, wherein the self-modifying synchronization address space is a writeback-invalidate cacheable address space.

9. The computer system of claim 1, wherein the semaphore memory cell is the size of a cache line.

10. The computer system of claim 1, wherein the busy state of the semaphore memory cell corresponds to a memory data read value of "1".

11. The computer system of claim 1, wherein the idle state of the semaphore memory cell corresponds to a memory data read value of "0".

12. The computer system of claim 1, the semaphore memory cell comprising:

a data portion for storing a memory data value indicating the state of the semaphore memory cell.

13. The computer system of claim 12, the semaphore memory cell comprising:

a control portion for controlling communication of the data portion to the plurality of busmasters.

14. The computer system of claim 13, the computer system including a plurality of bridges coupled to the host bus, the control portion comprising:

a bridge reflected write bit for indicating when to reflect a data portion storing a memory data write value from one bridge to another bridge.

15. The computer system of claim 13, the computer system including a plurality of bridges coupled to the host bus, the control portion comprising:

a write broadcast bit for indicating when to broadcast a data portion storing a memory data write value from one bridge to another bridge.

16. The computer system of claim 13, the computer system including at least one gateway coupled to a plurality of host busses, the control portion comprising:

a gateway reflected write bit for indicating when to reflect a data portion storing a memory data write value across the gateway.

17. The computer system of claim 1, the computer system including a bridge coupled to the host bus, further comprising:

synchronization bridge configuration logic provided in the bridge for configuring the self-modifying synchronization memory address space.

18. The computer system of claim 17, the synchronization bridge configuration logic comprising:

a synchronization memory address region enable bit for selectively enabling a region of the self-modifying synchronization memory address space in the bridge.

19. The computer system of claim 17, the synchronization bridge configuration logic comprising:

a reflector enable bit for selectively enabling a reflector mode of the bridge, the bridge reflecting a semaphore memory cell received by the bridge to another bridge when the bridge is in a reflector mode.

20. The computer system of claim 1, wherein each busmaster of the plurality of busmasters provides a synchronization address to request a semaphore memory cell.

21. The computer system of claim 20, the synchronization address comprising:

a set of bits representing the physical address of the self-modifying synchronization memory address space;

a set of bits representing an address of a semaphore memory cell of the self-modifying synchronization memory address space; and a set of bits representing a PCI busmaster identification value to inform a bridge of the identity of a PCI busmaster issuing a request to a semaphore memory cell.

22. The computer system of claim 1, further comprising:

a synchronization memory bus for providing a semaphore address to the self-modifying synchronization memory address space and providing a semaphore memory cell from the self-modifying synchronization memory address space.

23. The computer system of claim 1, the computer system including a bridge coupled to the host bus, further comprising:

a signal provided by the bridge for communicating when the bridge is ready to receive a broadcast write of a semaphore memory cell.

24. The computer system of claim 1, the plurality of busmasters comprising:

a plurality of PCI masters.

25. The computer system of claim 1, wherein at least one processor comprises a plurality of processors.

26. The computer system of claim 1, wherein at least one host bus comprises a plurality of host busses.

27. The computer system of claim 26, further comprising:
at least one gateway coupled between the plurality of host busses.

28. The computer system of claim 26, comprising:
a set of plurality of bridges, each plurality of bridges being coupled to a host bus of the plurality of host busses.

29. A synchronization method permitting shared memory communication between multiple busmasters in a computer system using semaphore memory cells of a synchronization memory address space, each semaphore memory cell having an idle state or a busy state, comprising the steps of:
reading state information in a semaphore memory cell by a busmaster, the semaphore memory cell being coupled between a host bus of the computer system and the busmaster, the self-modifying synchronization memory address space being accessible by the plurality of busmasters independent of the host bus;
self-switching of the semaphore memory cell to a busy state responsive to said read to the semaphore memory cell if the state information read by the busmaster corresponds to an idle state so that the busmaster owns the semaphore memory cell; and
retaining the busy state of the semaphore memory cell until a subsequent action by the busmaster that owns the semaphore memory cell triggers the semaphore memory cell to switch itself to the idle state,
wherein the step of reading state information is performed repeatedly by the busmaster until the semaphore memory cell is in the idle state.

30. The synchronization method of claim 29, further comprising the steps of writing state information to the semaphore memory cell by the busmaster owning the semaphore memory cell; and
self-switching of the semaphore memory cell to an idle state responsive to said write to the semaphore memory cell.

31. The synchronization method of claim 30, further comprising the step of:
broadcasting said write to the semaphore memory cell to other busmasters.

32. The synchronization method of claim 30, the busmaster including a write-through cache, further comprising the step of:
re-broadcasting the write to invalidate a cache line of a busmaster corresponding to said written semaphore memory cell.

33. The synchronization method of claim 30, the busmaster including a writeback-invalidate cache, further comprising the step of:
broadcasting said write to the semaphore memory cell to other busmasters; and
write invalidating a cache line of a busmaster corresponding to said written semaphore memory cell.

34. The synchronization method of claim 29, wherein the dedicated memory address space is within a memory controller of the computer system.

35. The synchronization method of claim 34, wherein the memory controller is within a bridge of the computer system.

36. The synchronization method of claim 34, wherein each semaphore memory cell is the size of a cache line.

37. The synchronization method of claim 29, wherein the busmaster owning the semaphore memory cell has exclusive access to a shared host memory region referenced by the semaphore memory cell in the busy state of the semaphore memory cell.

38. A synchronization method permitting shared memory communication between multiple busmasters in a computer system using semaphore memory cells of a self-modifying synchronization memory address space, comprising the steps of:
reading state information in a semaphore memory cell by a busmaster to determine if the semaphore memory cell is owned by another busmaster, the semaphore memory cell being coupled between a host bus of the computer system and the busmaster, the self-modifying synchronization memory address space being accessible by the plurality of busmasters independent of the host bus; and
repeatedly reading state information in the semaphore memory cell by the busmaster until the semaphore memory cell is owned by the busmaster.

39. The synchronization method of claim 38, further comprising the step of:
executing a request of the busmaster owning the semaphore memory cell to a shared host memory region referenced by the semaphore memory cell.

40. The synchronization method of claim 38, further comprising the step of:
self-switching of the semaphore memory cell to an idle state responsive to a write to the semaphore memory cell by the busmaster owning the semaphore memory cell so that the busmaster releases ownership of the semaphore memory cell.

41. The synchronization method of claim 38, wherein said step of repeatedly reading state information in the semaphore memory cell by the busmaster until the semaphore memory cell is owned by the busmaster comprises the step of spinning on the semaphore memory cell within a local cache of the busmaster.

42. The synchronization method of claim 38, further comprising the step of:
self-switching of the semaphore memory cell to a busy state responsive to a first read to the semaphore memory cell after a write to the semaphore memory cell.

43. A computer system adapted for a self-modifying synchronization memory protocol for multiple busmasters, comprising:
at least one processor;
at least one host bus coupled to the host processor;
a plurality of busmasters;
a self-modifying synchronization memory address space coupled to the host bus and including at least one semaphore memory cell having an idle state or a busy state, the self-modifying synchronization memory address space being coupled between the host bus and the plurality of busmasters, the self-modifying synchronization memory address space being accessible by the plurality of busmasters independent of the host bus;
the semaphore memory cell switching itself to a busy state only if the semaphore memory cell is read by a busmaster of the plurality of busmasters when the semaphore memory cell is in an idle state so that the semaphore memory cell is owned by the busmaster; and
a shared critical resource mapped into the self-modifying synchronization memory address space,
wherein the semaphore memory cell retains the busy state until a subsequent action by the busmaster that owns the semaphore memory cell triggers the semaphore memory cell to switch itself to the idle state, and wherein a busmaster desiring ownership of the semaphore memory cell repeatedly reads the semaphore memory cell until the semaphore memory cell is owned by the busmaster desiring ownership of the semaphore memory cell.

44. The computer system of claim 43, wherein the semaphore memory cell switches itself to an idle state if a write is issued to the semaphore memory cell by a busmaster owning the semaphore memory cell so that the busmaster releases ownership of the semaphore memory cell.

45. The computer system of claim 43, the computer system including a memory controller, wherein the self-modifying synchronization address space is located in the memory controller.

46. The computer system of claim 45, the computer system including a bridge, wherein the memory controller is located in the bridge.

47. The computer system of claim 43, wherein the shared critical resource is a mass storage subsystem.

48. The computer system of claim 43, wherein the shared critical resource is a video subsystem.

* * * * *